United States Patent [19]
Tsujimoto et al.

[11] Patent Number: 5,340,262
[45] Date of Patent: Aug. 23, 1994

[54] AUTOMATIC WAREHOUSING SYSTEM AND OPERATING FILE THEREFOR

[75] Inventors: Kazushi Tsujimoto; Yukihiro Goto; Katsuji Ohnishi, all of Komaki, Japan

[73] Assignee: Daifuku Co., Ltd., Osaka, Japan

[21] Appl. No.: 793,405

[22] PCT Filed: May 14, 1992

[86] PCT No.: PCT/JP91/00636
§ 371 Date: Jan. 13, 1992
§ 102(e) Date: Jan. 13, 1992

[87] PCT Pub. No.: WO91/17936
PCT Pub. Date: Nov. 28, 1991

[30] Foreign Application Priority Data

| May 17, 1990 | [JP] | Japan | 2-128532 |
| Nov. 26, 1990 | [JP] | Japan | 2-324416 |
| Jan. 11, 1991 | [JP] | Japan | 3-001762 |
| Feb. 14, 1991 | [JP] | Japan | 3-020219 |
| Feb. 14, 1991 | [JP] | Japan | 3-020220 |
| Feb. 18, 1991 | [JP] | Japan | 3-022451 |
| Mar. 15, 1991 | [JP] | Japan | 3-050077 |
| Mar. 15, 1991 | [JP] | Japan | 3-050078 |
| Mar. 15, 1991 | [JP] | Japan | 3-050079 |
| Mar. 29, 1991 | [JP] | Japan | 3-065858 |

[51] Int. Cl.$^5$ .............................................. B65G 1/00
[52] U.S. Cl. .................................... 414/273; 364/478
[58] Field of Search .......................... 414/273, 277–283; 364/478; 156/56; 235/385, 383, 375, 462

[56] References Cited

U.S. PATENT DOCUMENTS

| 3,964,577 | 6/1976 | Bengtsson | 414/281 X |
| 4,789,293 | 12/1988 | Hashimoto et al. | 364/478 X |
| 4,903,815 | 2/1990 | Hirschfeld et al. | 414/273 X |
| 4,945,429 | 7/1990 | Munro et al. | 364/478 X |
| 5,141,380 | 8/1992 | Kato et al. | 414/273 |

FOREIGN PATENT DOCUMENTS

| 49-28074 | 3/1974 | Japan . |
| 53-34279 | 3/1978 | Japan . |
| 57-38201 | 3/1982 | Japan . |
| 144002 | 8/1983 | Japan | 414/273 |
| 197303 | 9/1986 | Japan | 414/273 |
| 273402 | 12/1986 | Japan | 414/273 |
| 74809 | 4/1987 | Japan | 414/273 |
| 63-27304 | 2/1988 | Japan . |
| 47205 | 2/1988 | Japan | 414/273 |
| 267601 | 11/1988 | Japan | 414/273 |
| 28101 | 1/1989 | Japan | 414/273 |
| 1-156202 | 6/1989 | Japan . |
| 48312 | 2/1990 | Japan | 414/273 |

Primary Examiner—David A. Bucci
Attorney, Agent, or Firm—Barnes, Kisselle, Raisch, Choate, Whittemore & Hulbert

[57] ABSTRACT

An automatic warehousing system which provides for improvement in the operating efficiency of the operator. An operating file has codes formed therein for incoming and outgoing goods. A code signal corresponding to a load and a operation mode signal for operation of the automatic warehousing system which are searched from the file are input to a control unit which controls load entry and delivery operations of a load handling crane. Management of load storing spaces within the rack and goods stored in the spaces is carried out according to these signals. In this way, inventory management is carried out by the control unit. Therefore, the operator can perform entry and delivery setting for the control unit without considering the rack number of the load storing space with respect to the load being handled. The system involves less operational procedure than the prior art arrangement and contributes toward improved operating efficiency.

6 Claims, 20 Drawing Sheets

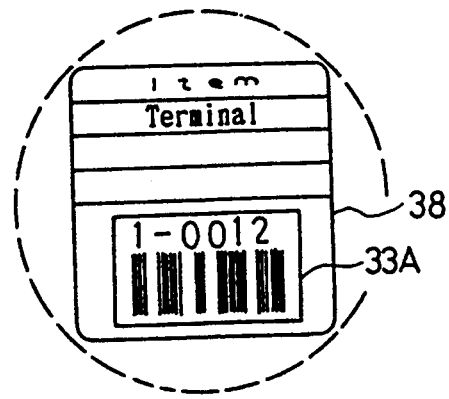
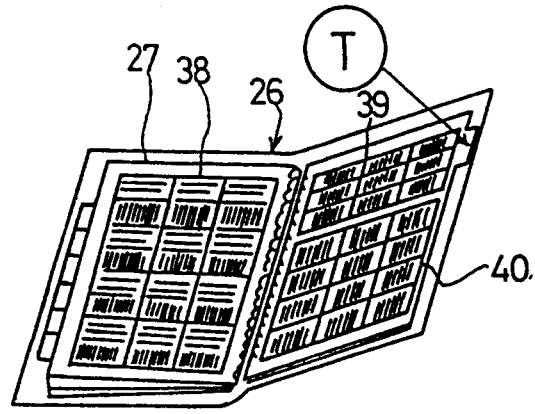
FIG.17b          FIG.17a
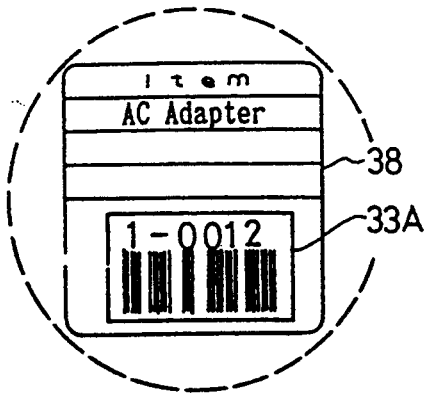
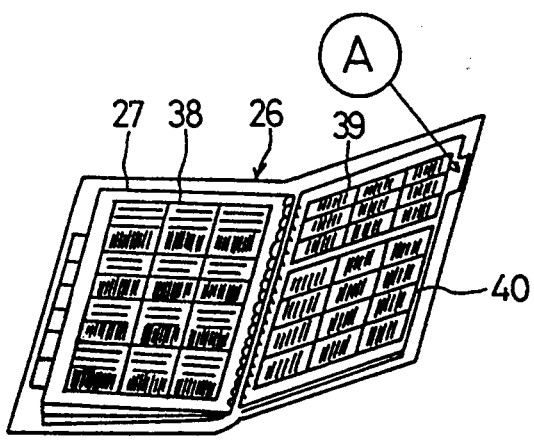
FIG.17d          FIG.17c FIG 19
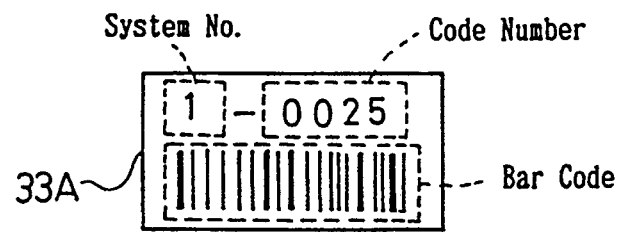
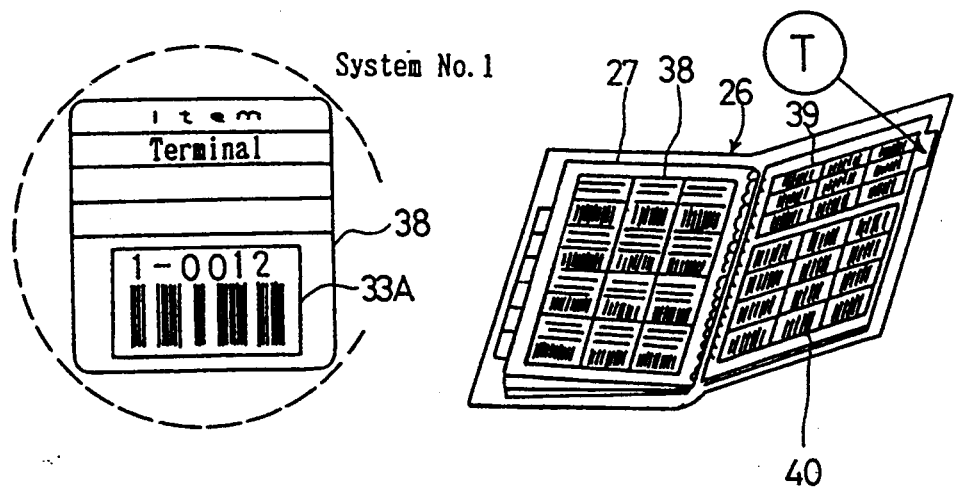
FIG. 20b
FIG. 20a
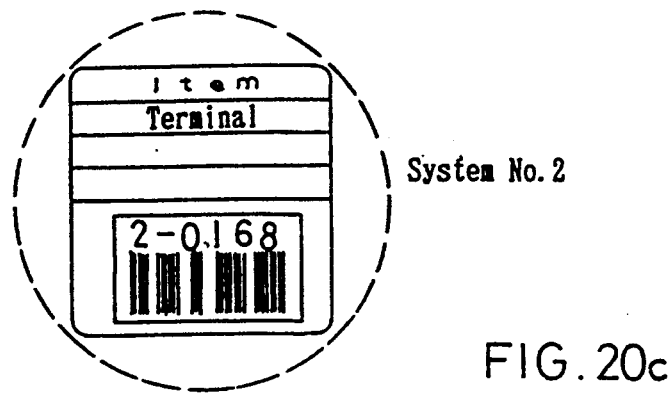
FIG. 20c FIG. 22
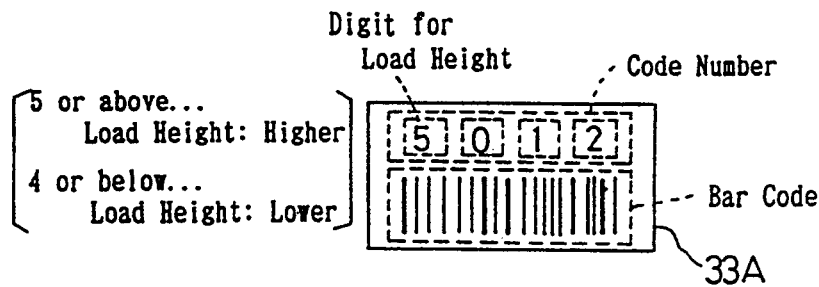
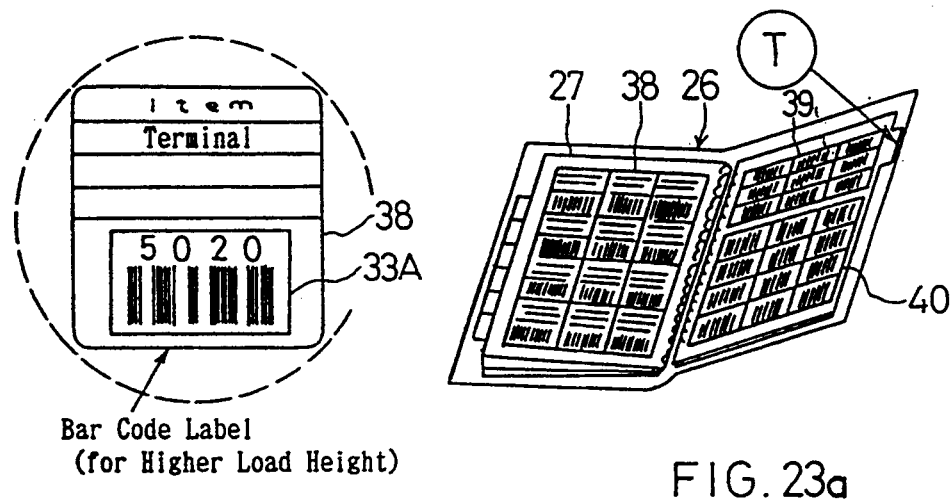
FIG. 23b
FIG. 23a
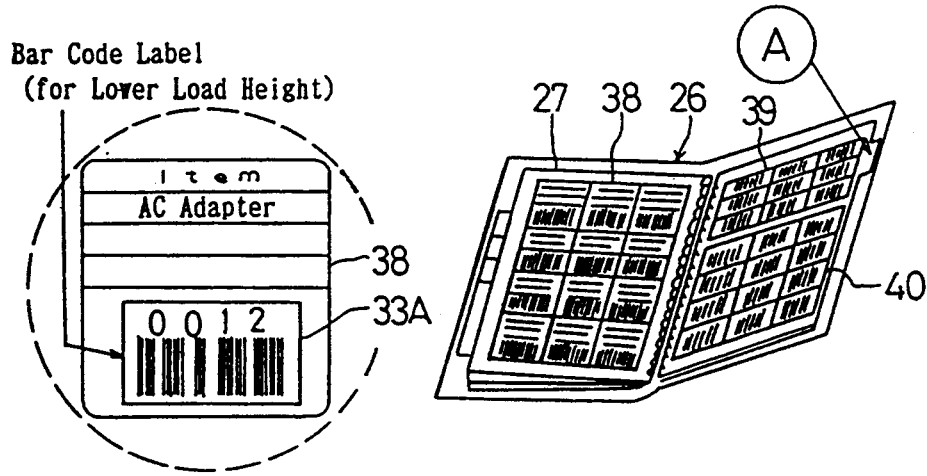
FIG. 23d
FIG. 23c

AUTOMATIC WAREHOUSING SYSTEM AND OPERATING FILE THEREFOR

TECHNICAL FIELD

The present invention relates to an automatic warehousing system installed indoors for keeping goods in storage and for receiving incoming load and delivering outgoing load as required, and an operating file provided in the warehousing system.

BACKGROUND ART

Automatic warehousing systems of this type have been known, a typical one of which is disclosed in, for example, Japanese Utility Model Laid Open Publication No. 1-169511.

In this prior art disclosure, the automatic warehousing system includes a rack having a plurality of load storing spaces, a load sorting device disposed outside of one end of each rack, a load handling mobile crane movable on a travel passage extending along the front side of the rack and load sorting device, and an safety fence erected laterally along one side of the load sorting device and in opposed relation to the travel passage, the safety fence being provided with a crane control panel and an access door.

According to this known arrangement, it is possible to carry out delivery of load between any particular load storing space and the load sorting device by operating the load handling mobile crane through control from the crane control panel. For maintenance and checking of the rack and mobile crane, an operator opens the access door for entry in the travel passage while the mobile crane is held in its non-operating state.

Inputting of instructions to the crane control panel is carried out in such a way that a mode switch for switching from a load entry mode to a load exit mode and vice versa and a finish switch manipulatable at the end of an operation are manipulated to give instructions as to the mode of required operation, i.e., load entry or load exit, and as to operation ending, and in addition a particular number for the load storing space into or from which a load is to be placed or withdrawn is input by using a rack number card in which the rack number is printed in bar code, such card being provided for each respective load storing space. Rack number cards are kept in orderly arrangement in a card holding case disposed adjacent the warehousing installation.

In carrying out load entry and delivery operations, the operator determines the desired rack number from the name of goods written in a load entry/delivery slip and according to an item-rack number list, takes out a rack number card corresponding to the rack number from the card holding case through card search, causes the rack number card to be read by a bar code reader, and then inputs the rack number to the crane control panel. After the load entry/delivery operation is executed, the rack number card is put back into position in the card holding case. Inventory management is carried out by hand writing the name of goods and quantity received or delivered in a control sheet attached to the rack number card.

However, such prior art practice involves a problem that a wrong rack-number card may sometimes be fetched, instead of the desired rack-number card, out of a series of rack number cards arranged in the card holding case. Another problem is that the rack number card taken out may be improperly placed back into the card holding case or may be left unreturned to the card holding case. All these problems are likely to occur from or in connection with the use of rack-number cards.

Further, the prior art system requires some operations to be carried out by the operator. That is, the operator must check to see that the name of goods for each load is correct in relation to the corresponding rack number and must also maintain control sheets in order. This naturally results in poor operating efficiency and is likely to induce operational errors.

DISCLOSURE OF THE INVENTION

It is a primary object of the invention to provide an automatic warehousing system and an operating file therefor which eliminates all inconveniences arising from the use of rack number cards and provides for improvement in the operating efficiency of the operator.

In order to accomplish this object, according to the invention there is provided an automatic warehousing system comprising a rack having a plurality of load storing spaces, load handling means for handling goods for entry into and delivery from the load storing spaces within said rack, a table having codes formed therein corresponding to the goods, input means for inputting operation modes and said codes corresponding to the goods, and control means which performs management of each of said load storing spaces in said rack and goods stored in each load storing space according to an operation mode signal and a code signal corresponding to the goods, input from said input means, and which controls load entry and delivery operations of said load handling means.

According to such arrangement, management of any load storing space of the rack and goods stored in the load storing space is carried out by the control means in response to an operation mode signal and a code signal corresponding to the goods which are input from the input means. Therefore, the operator can carry out load entry and delivery operations by locating from the file through search a code corresponding to the goods and inputting the code and a relevant operation mode, without giving attention to the rack number for the load storing space and without using any such rack number card as has conventionally been used. Furthermore, the arrangement of the invention involves less operational procedure than the prior art arrangement and provides for improvement in operating efficiency.

BRIEF DESCRIPTION OF THE DRAWINGS

FIG. 17a is a perspective view showing another embodiment of the operating file for the automatic warehousing system according to the invention, wherein the operating file is shown opened;

FIG. 17b shows within the dotted circle a portion of the operating file in FIG. 17a;

FIG. 17c is a perspective view showing another embodiment of the operating file for the automatic warehousing system according to the invention, wherein the operating file is shown opened;

FIG. 17d shows within the dotted circle a portion of the operating file in FIG. 17c;

FIG. 18b shows within the dotted circle a portion of the operating file in FIG. 18a;

FIG. 19 is a plan view showing a bar code label in another embodiment of the operating file for the automatic warehousing system according to the invention;

FIG. 20a is a perspective view showing another embodiment of the operating file for the automatic warehousing system according to the invention, wherein the operating file is shown opened;

FIG. 20b shows within the dotted circle a portion of the operating file in FIG. 20a;

FIG. 20c shows within the dotted circle a portion of the operating file in FIG. 20a;

FIG. 22 is a plan view showing a bar code label in the operating file for the automatic warehousing system;

FIG. 23a is a perspective view showing the operating file for the automatic warehousing system when the file is opened;

FIG. 23b shows within the dotted circle a portion of the operating file in FIG. 23a;

FIG. 23c is a perspective view showing the operating file for the automatic warehousing system when the file is opened; and FIG. 23d shows within the dotted circle a portion of the operating file in FIG. 23c.

BEST MODE FOR CARRYING OUT THE INVENTION

Figure 1:
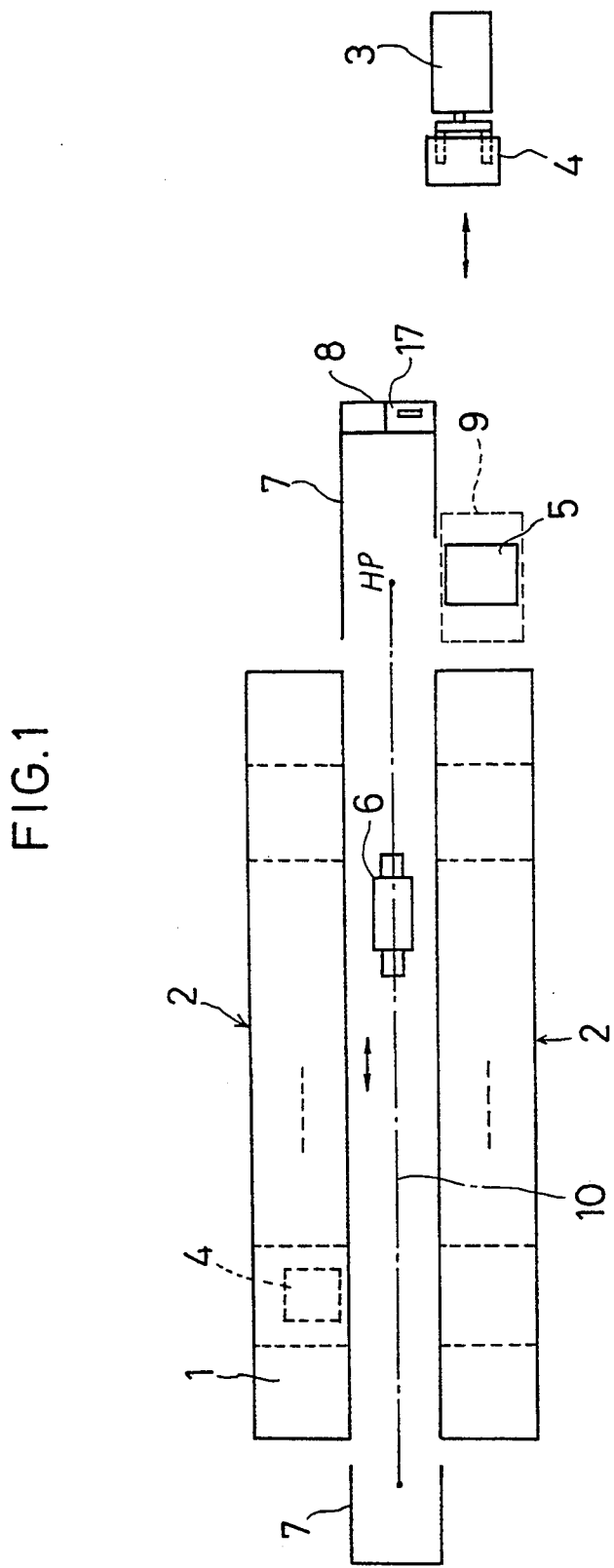
FIG. 1 is a layout view of an automatic warehousing system representing one embodiment of the present invention.

An automatic warehousing system, as FIG. 1 layout diagram shows by way of example, comprises a rack 2 having a multiplicity of load storing spaces 1 defined in vertically and horizontally adjoining relation therein, a delivery table 5 disposed in a sorting station 9 located externally of one end of the rack 2 which is employed in carrying out delivery of load 4 from and to a loading and unloading vehicle 3, such as a forklift truck, a crane 6 or a load handling device movable on a predetermined path 10 along the length of the rack 2 for delivery of the load 4 from the delivery table 5 onto any of the load storing spaces 1 in the rack 2 and vice versa, a safety fence (safety enclosure) 7 disposed opposite to each end of the predetermined path 10 and having a U-shaped configuration in plan view which is provided to ensure safety of the operator, and a control unit 8 which transmits and receives signals to and from the crane 6 through an optical transmission device to thereby control the crane 6.

The safety fence 7 disposed on the sorting station 9 side, as may be seen from FIGS. 2 to 5, comprises side fences 11 located at both sides of the predetermined path 10, unit frames 12 connected to the outer ends of the side fences 11, and a front frame 13 interconnecing the lower ends of the unit frames 12 and having an upstanding portion. The control unit 8, which is provided on the ground side, is disposed adjacent one side of the front frame 13.

Disposed adjacent the other side of the front frame 13 is a door structure 15 which is hinged on the ground-side control unit 8 side at 14 for being pivoted back and forth for opening and closing movement. A manual lock device 16 for keeping the door structure 15 at its closed position is provided at a location opposite the set of hinges 14.

Figure 4:
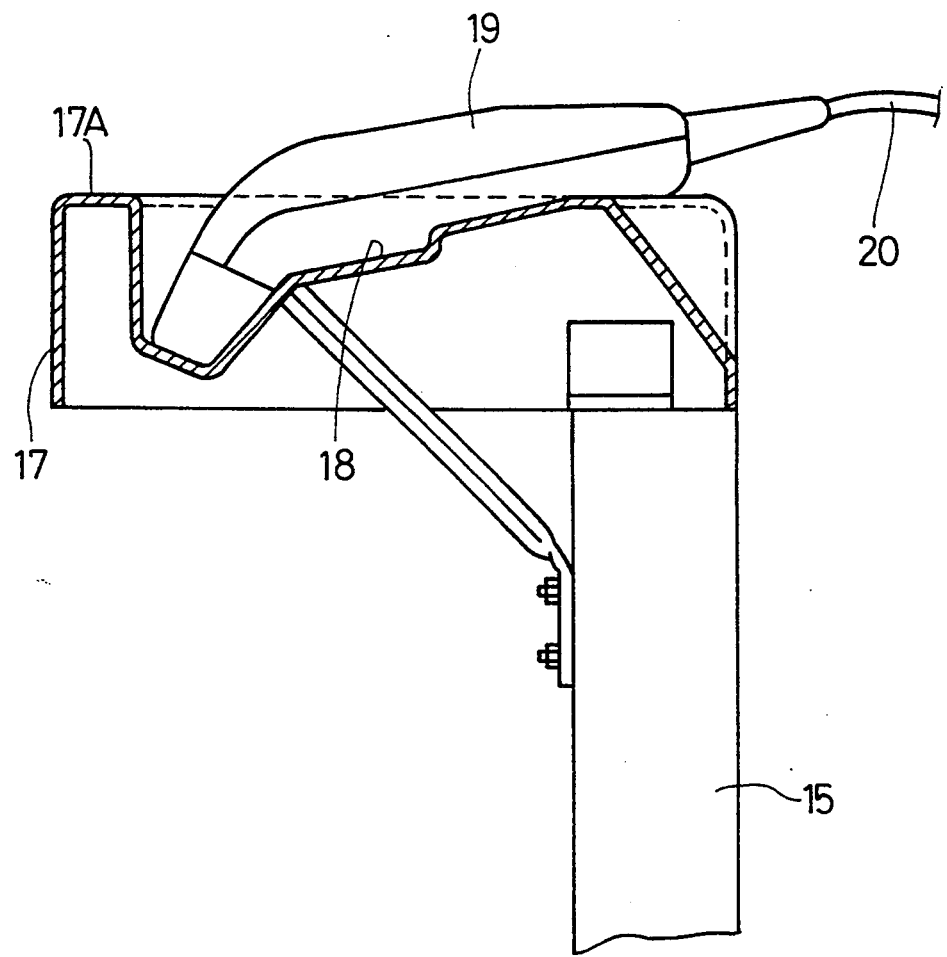
FIG. 4 is a side view in longitudinal section showing a setting portion provided in the automatic warehousing system.

The door structure 15 is flat plate-shaped and, in continuation to the top end thereof, there is provided an elongate table 17 which projects toward the rack 2. As FIG. 4 shows, the table 17 is formed thereon at a location adjacent the ground side control unit 8 with a setting portion 18 adapted for setting therein a handy-type code reader 19 connected to the ground side control unit 8. The setting portion 18 is recessed after the shape of the code reader 19 so as to permit the code reader 19 to be fitted therein. The code reader 19 is connected to the ground side control unit 8 through a cord 20. It is noted that the code reader 19 may be separably connected to the ground side control unit 8.

Figure 5:
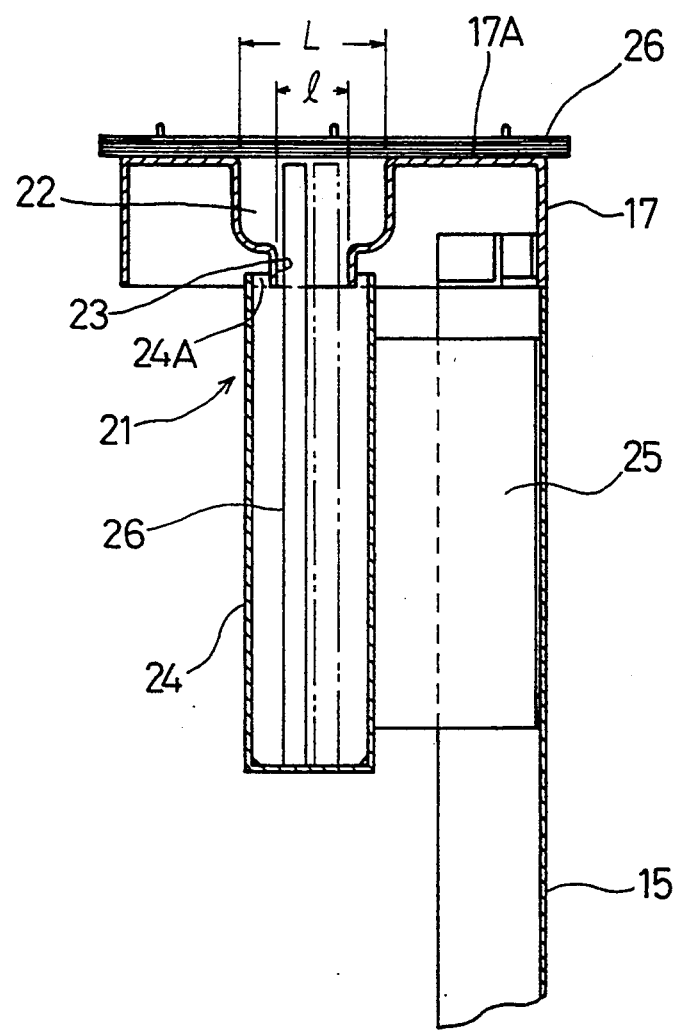
FIG. 5 is a side view in longitudinal section showing a file housing portion of the automatic warehousing system.

A file holding device 21 is disposed on the table 17 at a location spaced apart from the ground side control unit 8. As FIG. 5 shows, the table 17 is formed with a laterally extending recess 22 having a large width L which has an elongate slit-like insertion hole 23 formed at its bottom, the insertion hole 23 having a narrower width l than the recess 22 and extending in the vertical direction. A box-shaped holding portion 24 is fixed to the door structure 15 through a connecting member 25, a top end opening 24A of the holding portion 24 being in communication with the insertion hole 23.

A file adapted for being received in the holding portion 24 through the insertion hole 23 is provided which is, for example, an operating file 26. A plurality of such files 26 (two in number in the present embodiment) may be housed in the holding portion 24. It is arranged that when the operating files 26 are received in the holding portion 24, their top ends are positioned lower than the surface 17A of the table 17 and within the recess 22.

Figure 8:
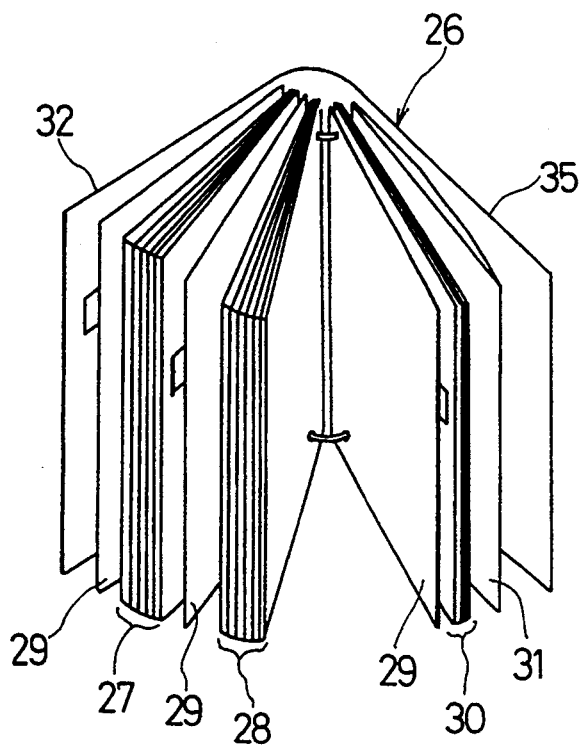
FIG. 8 is a perspective view of an operating file for the automatic warehousing system.

As shown in FIG. 8, each of the operating files 26 comprises a plurality of item sheets 27 for use in inputting instructions, such as load entry and load exit, an operating manual 28 for the automatic warehousing system, index sheets 29, memo sheets 30, and a bag-like sheet 31.

Figure 9A:
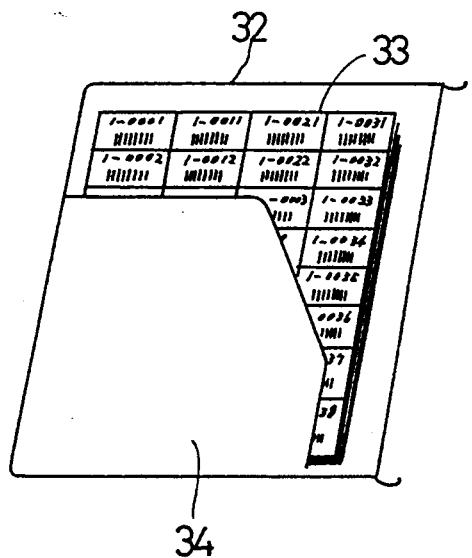
FIGS. 9A and 9B are perspective views showing front cover and back cover portions of the operating file for the automatic warehousing system.
Figure 9B:
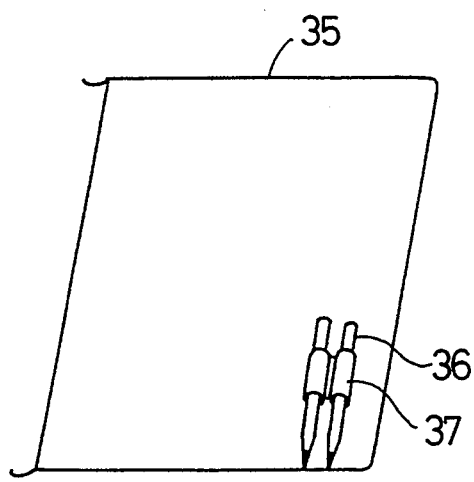
Figure 10:
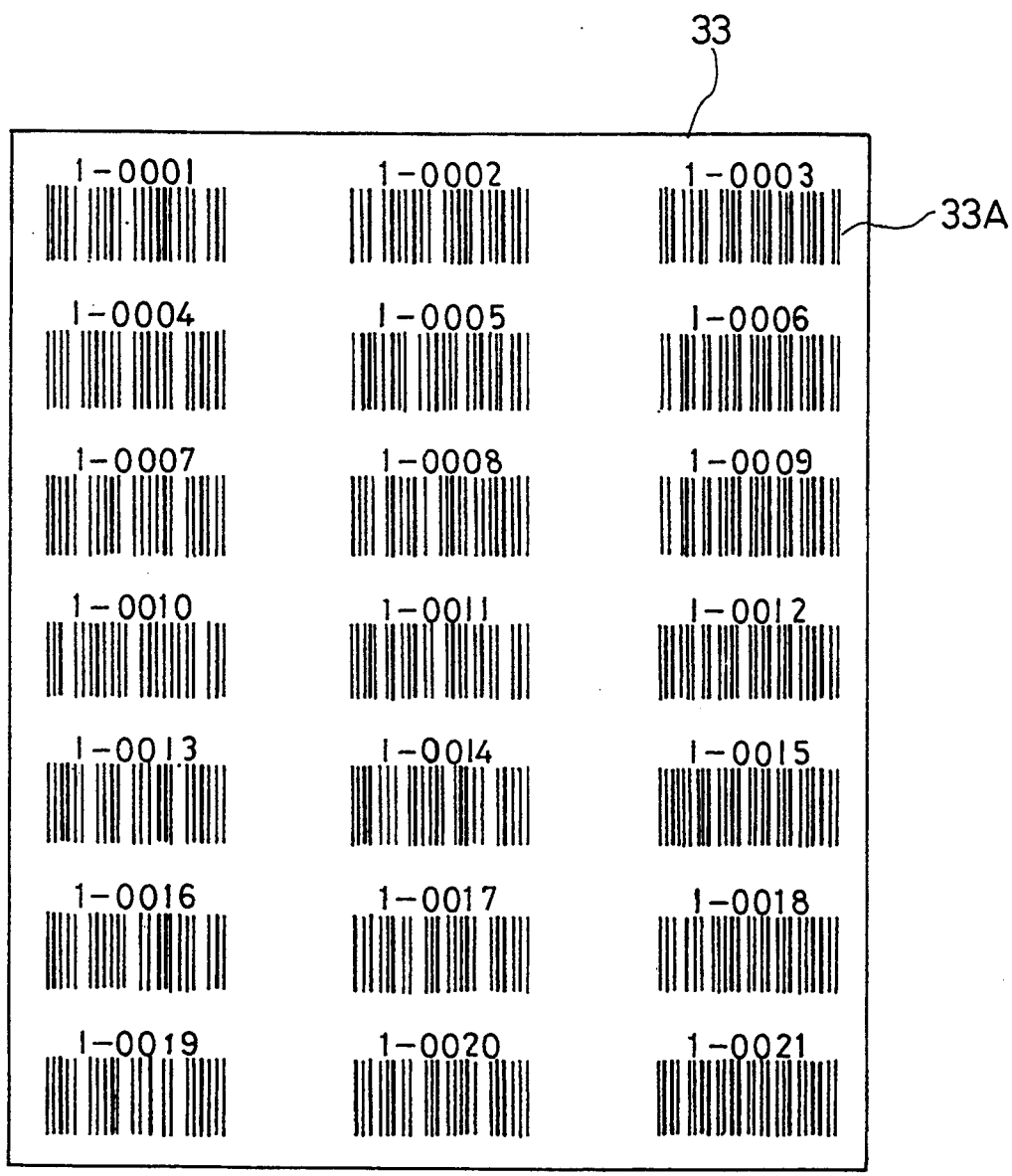
FIG. 10 is a plan view showing a code sheet of the operating file for the automatic warehousing system.

Attached to the back of front cover 32 of the operating file 26 is a pouch 34 for holding code sheets 33 as shown by way of example in FIG. 9A, attached to the back cover 35 of the file 26 are pockets 37 for holding, for example, pens 36.

Figure 11:
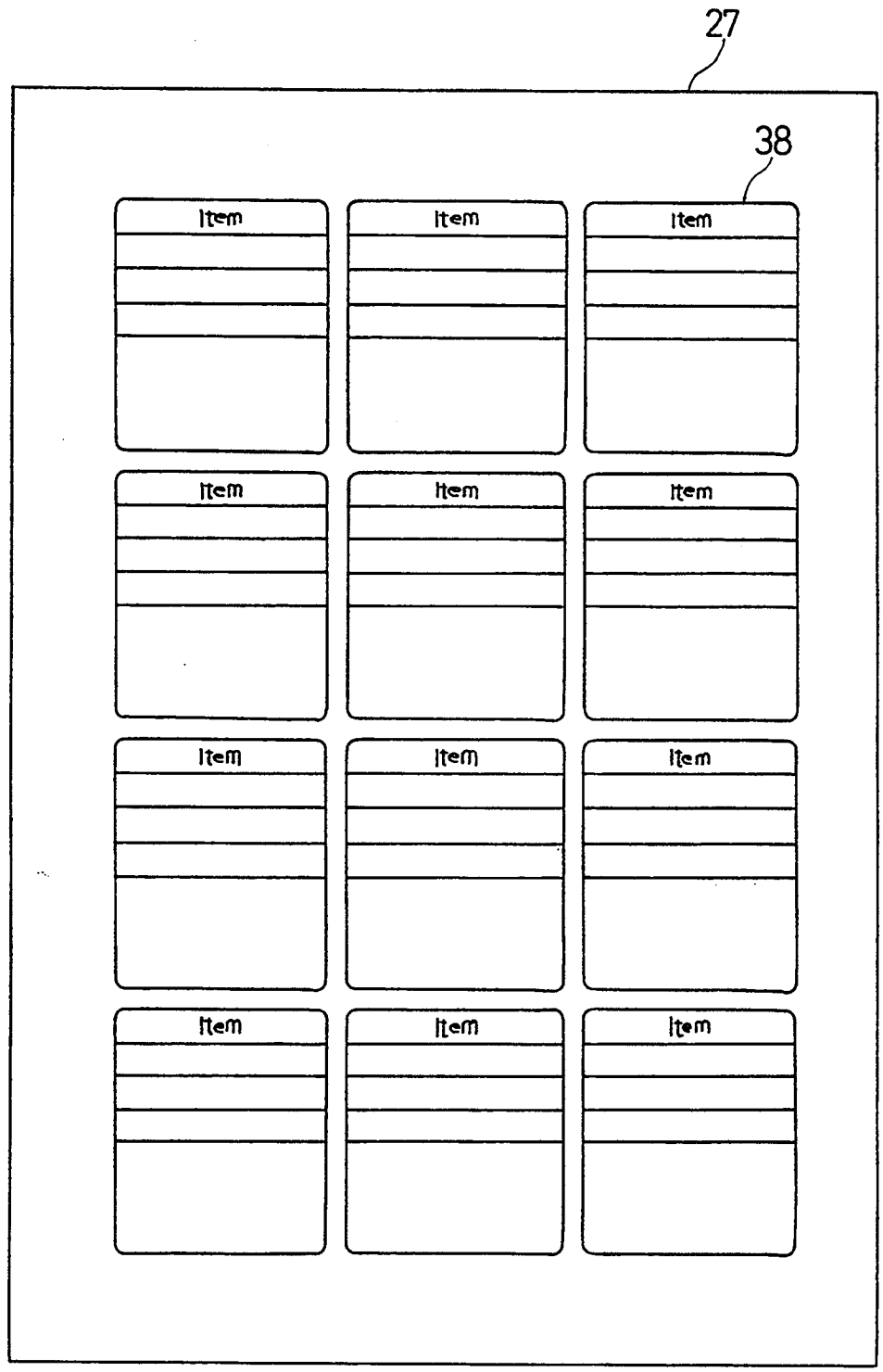
FIG. 11 is a plan view showing one side of an item sheet of the operating file for the automatic warehousing system.
Figure 12:
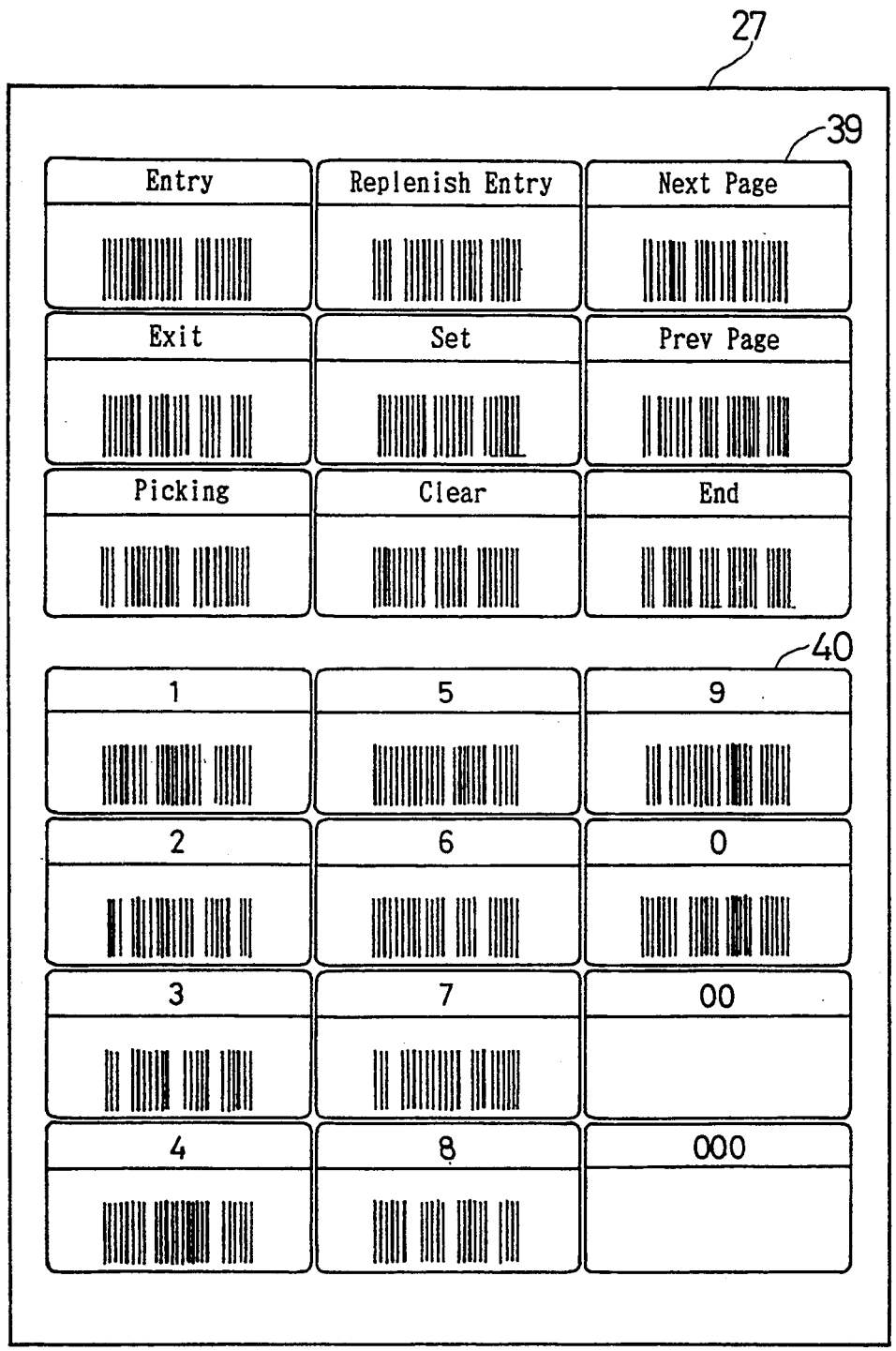
FIG. 12 is a plan view showing the other side of the item sheet of the operating file for the automatic warehousing system.
Figure 13:
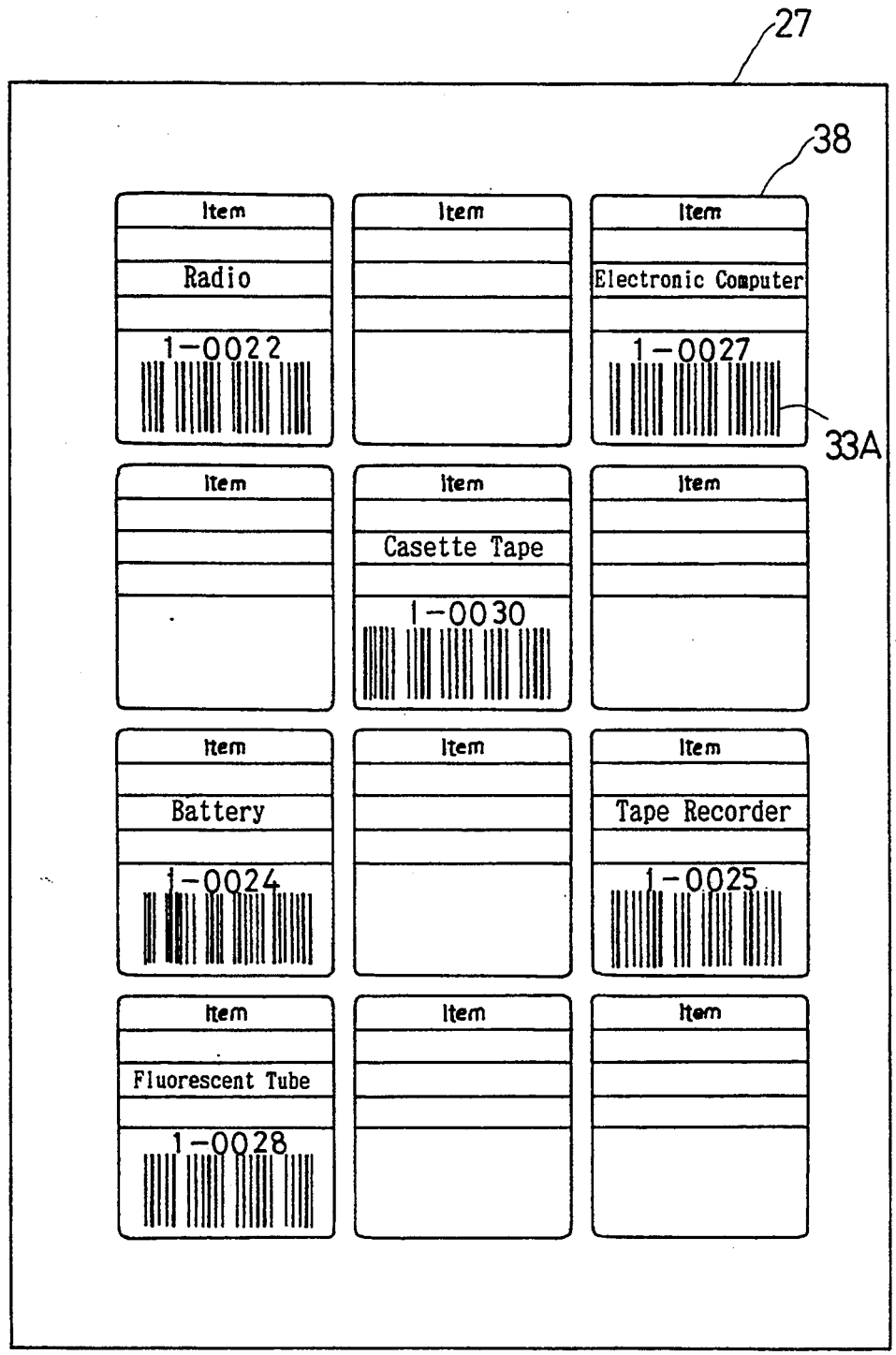
FIG. 13 is a plan view showing by way of example particulars written on one side of the item sheet of the operating file for the automatic warehousing system.

Each item sheet 27, as shown in FIGS. 11 and 12, has on one side thereof a plurality of columns 38 printed each of which has an upper portion designed for entry in writing of name of goods and item number with respect to load 4 and a lower portion designed for putting thereon an adhesive back-coated bar-code label 33A released from a code sheet 33, each column 38 corresponding to one name of good or one item with respect to the load 4 (which column is hereinafter referred to as item column), and has on the other side thereof a plurality of bar codes printed including operation bar codes 39 for setting particulars of operation, etc, and numerical bar codes 40 for setting quantity of loads 4 to be handled, etc. Each item column 38 is used in such a way that name of goods (for example, radio, or electronic digital computer as in FIG. 13) is writen by pen 36 with respect to load 4 to be stored in the automatic warehousing system, with an adhesive back coated bar-code label 33A released from a code sheet 33 being sticked on as above stated. It is noted that bar codes on individual bar code seals 33A are different from one another. Particulars to be written in item columns 38 are not limited to name of goods and may be kind of load 4, item number, or the like that can identify the load 4.

Figure 14:
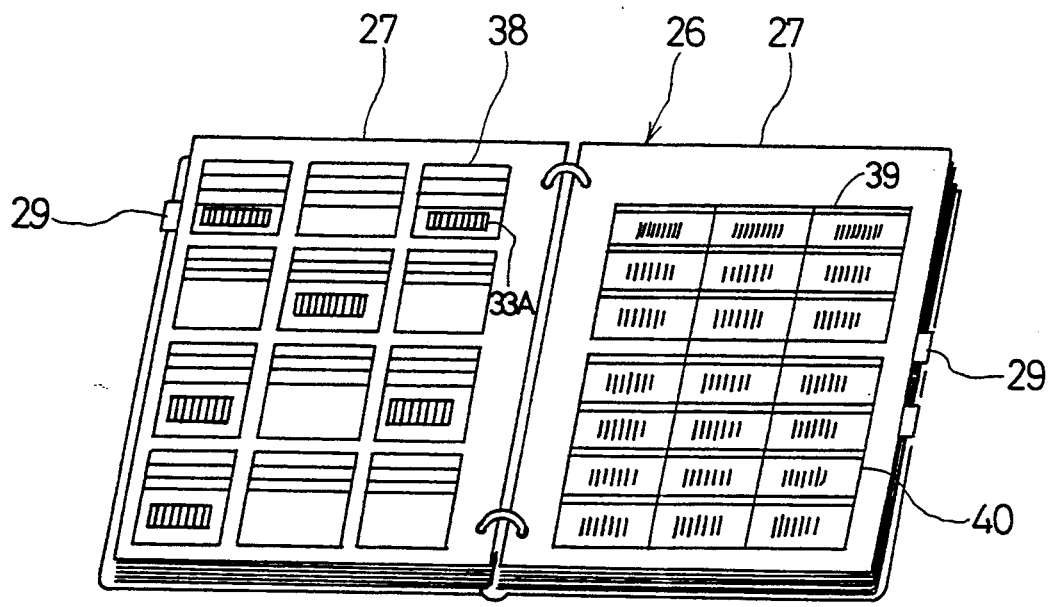
FIG. 14 is a perspective view showing the operating file for the automatic warehousing system when it is opened.

Instruction inputting to the ground-side control unit 8 is carried out basically by inputting a bar code contained in the operating file 26 through the bar code reader 19. For the purpose of instruction inputting, initially the operator stands in front of the door structure 15 and takes out operating file 26 from the holding device 21. To take out the operating file 26, the operator positions his hand in the recess 22. Then, the operating file 26 is placed on the table surface 17A and opens the file 26 at the desired item sheet 27 page. When the file 26 is opened at this item sheet 27 page on which a relevant item column 38 is formed, as shown in FIG. 14, bar codes 39, 40 for setting the required operation mode with respect to the operation of the automatic warehousing system and for setting particulars of the operation are always present at the opposite page. Therefore, necessary bar code reading is completed only upon reading of the opposite two pages and, any wrong setting, if made at all, can readily be corrected. The trouble of changing one rack number card with another, as has hitherto been encountered, is eliminated and operating efficiency can thus be improved.

Accordingly, the operator is enabled to easily carry out load entry/delivery setting by fetching the code reader 19 placed in the setting portion 18 and causing the code reader 19 to read the operation bar code 39 and numerical bar code 40 for the load 4, and the bar code on the bar code label 33A in the item column 38, which bar codes are printed on the relevant opposite pages.

The required load entry/delivery operation can be performed in this way, and the operator returns the code reader 19 to the setting portion 18 and places the operating file 26 after use thereof back into the holding device 21 for storage therein.

Upon being so placed back into position, the top side of the operating file 26 is positioned lower than the table surface 17A and within the recess 22. Since the code reader 19 is placed in the setting portion 18 which is located adjacent the ground-side control unit 8, the table surface 17 can be utilized for placing any other item thereon and can also be readily utilized in such a way that one of the plurality of operating files, when taken out, is placed open on the table surface 17A.

Maintenance and checking of the rack 3 and crane 6 can be carried by the operator unlocking the lock device 16 and opening the door structure 15 to enter the predetermined path 10. In this case, there is no possibility of the code reader 19 falling off due to vibrations caused by opening and closing movement of the door structure 15, because the code reader 19 is fitted in the setting portion 18 recessed near the pivot points for door opening and closing and adjacent the ground-side control unit 8.

Figure 2:
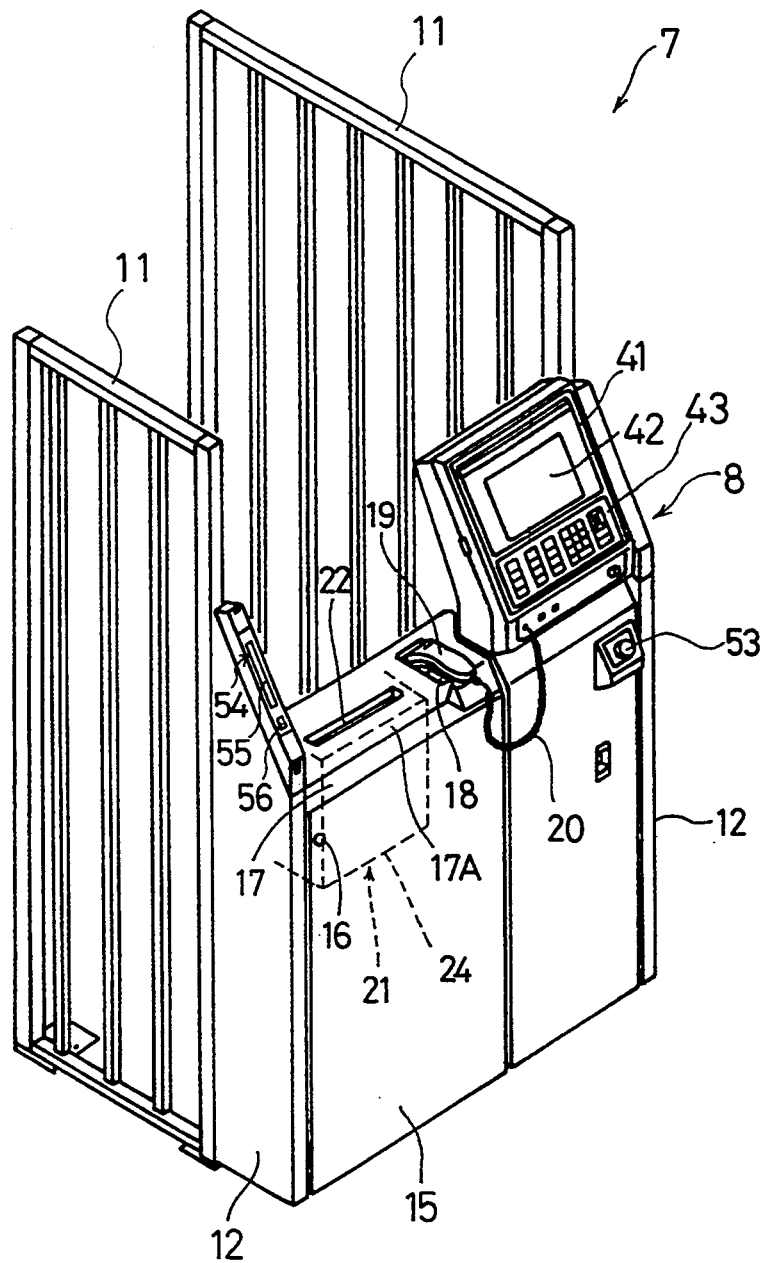
FIGS. 2 and 3 are, respectively, perspective and front views showing a safety fence portion of the automatic warehousing system.
Figure 3:
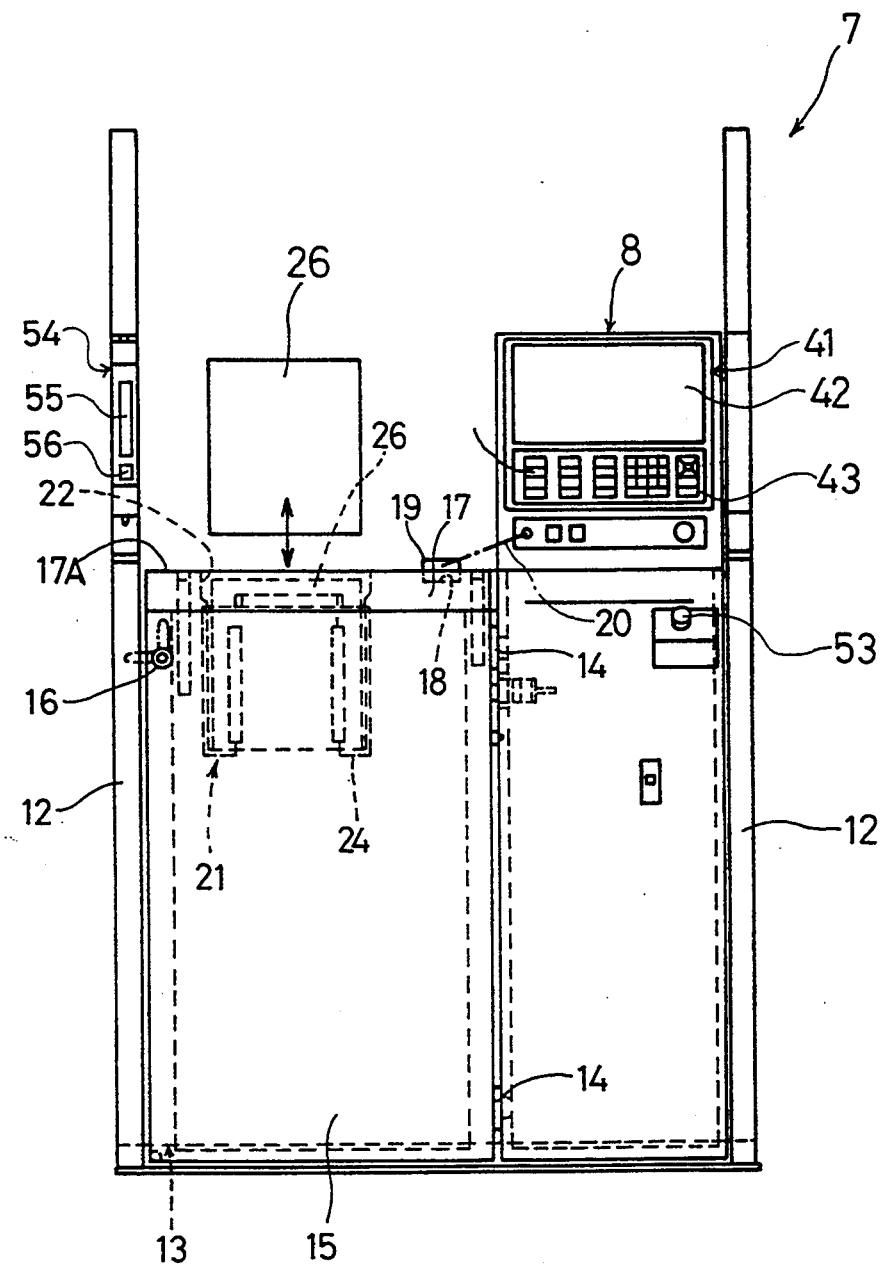
Figure 6:
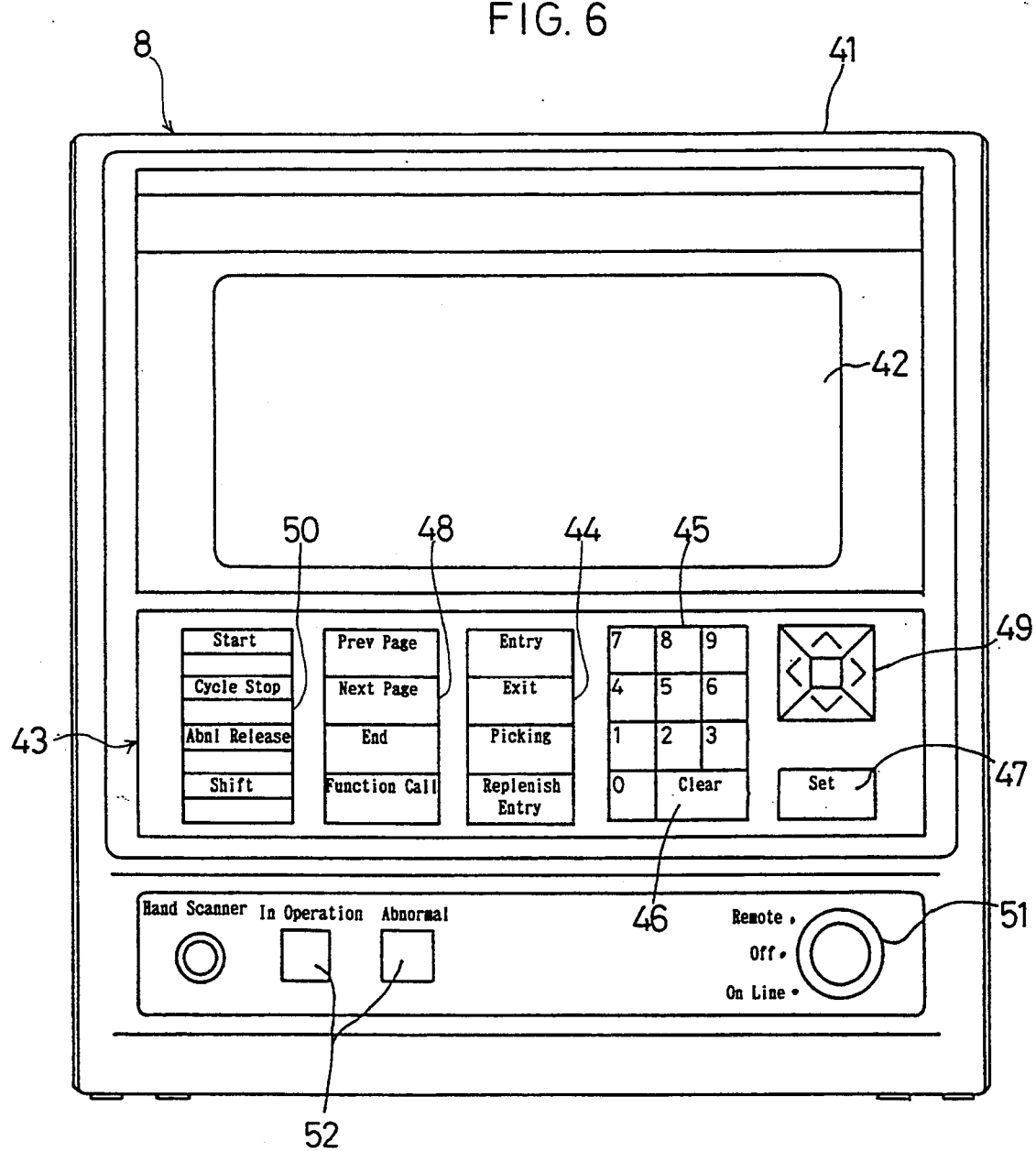
FIG. 6 is a front view of a control panel in the automatic warehousing system.

On the surface of the control unit 8, as FIGS. 2, 3 and 6 show, there is provided a control panel 41 which is equipped with a liquid crystal display 42 for display of operation mode status and failure and a manual control device 43 for use during manual mode operation in which the code reader 19 is not used.

Figure 7:
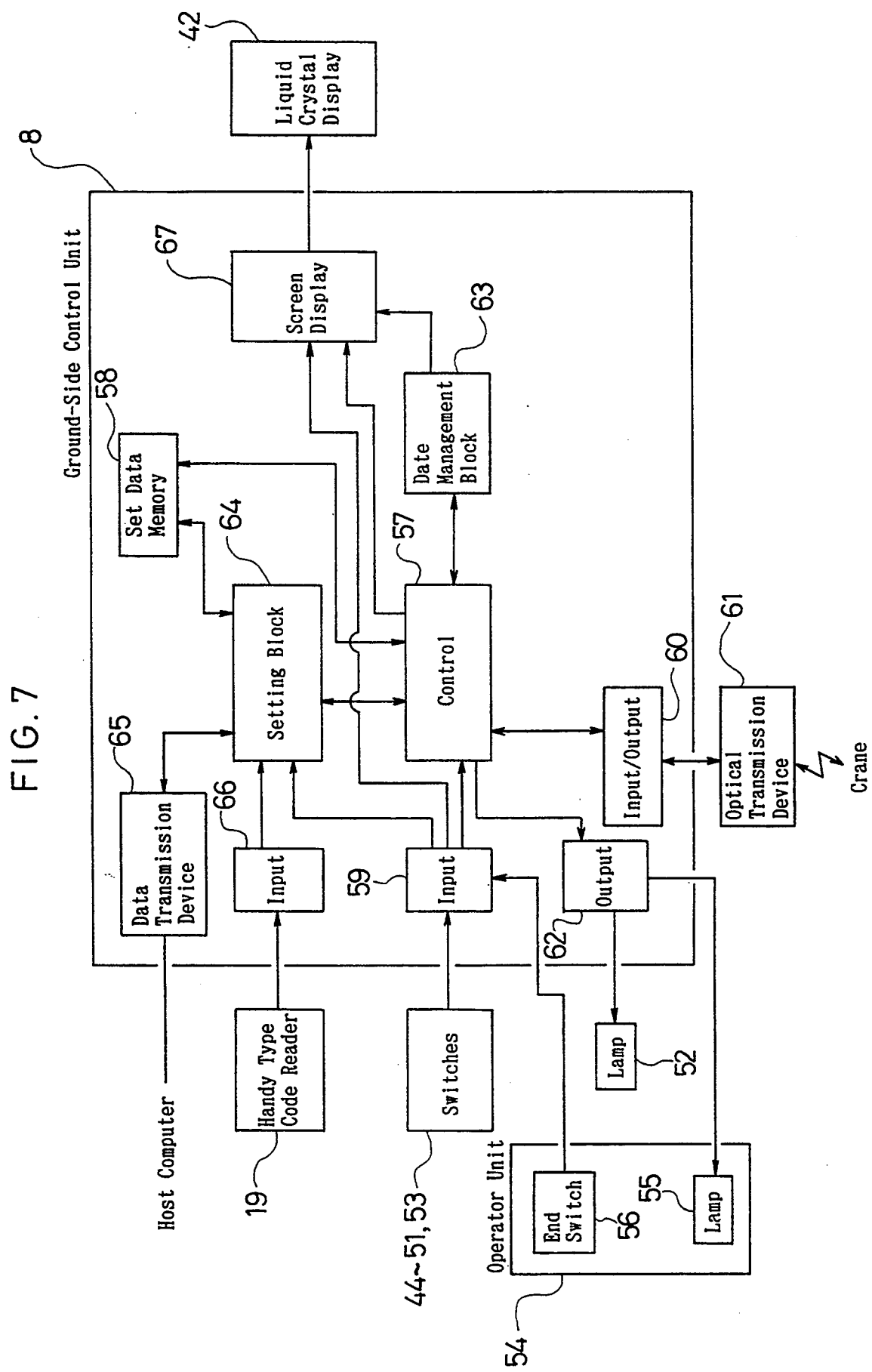
FIG. 7 is a block diagram showing a control arrangement in the automatic warehousing system.

The manual control device 43 comprises an operation mode setting switch 44 for setting respective modes of operations, such as load entry, load exit, picking and replenishment entry, and quantities of incoming and outgoing goods, a ten-key switch 45, a clear switch 46, and a set switch 47 and, in addition, a screen setting switch 48 (including a function calling switch and a page turning switch), a cursor shifting switch 49, and a control switch 50 for starting, cycle ending, abnormality status releasing, and shift controlling. The control panel 41 also has a key switch 51 for selecting a remote mode to be set by using the control panel 41, an on-line mode to be set in response to a set signal from a host controller (not shown), or a foreign mode in which the automatic warehousing system is not employed, and indicator lamps 52 for indicating "in operation" and "abnormal". An emergency stop switch 53 is provided beneath the control panel 41. These components are connected to the control unit 8 as shown in FIG. 7.

As can be seen from FIGS. 2 and 3, an operator unit 54 for the delivery table 5 is provided on the top of one of the unit frames 12. This operator unit 54 is provided with an indicator lamp 55 indicating the mode of operation, and an ending switch 56 for inputting the ending of operation. The indicator lamp 55 and ending switch 56 are connected to the control unit 8 as shown in FIG. 7.

Nextly, the ground-side control unit 8 will be explained with reference to the block diagram of FIG. 7.

A control 57 fetches operating data preset in a set data memory 58 which consist of operation mode, code for name of goods or item number with respect to load 4, and quantity of the load 4, and controls the crane 6 via an input/output 60 and an optical transmission unit 61 on the basis of the operating data, status detection data input from the crane 6 through the input/output 60 and optical transmission unit 61, and item name-rack number data stored in a data management block 63 which consists of number of load storing space 1 and name of the goods or item number with respect to the load 4. Simultaneously, the control 57 controls the indicator lamps 52, 55 and updates inventory management data stored in a data management block 63 that consist of goods name or item number with respect to the load 4 and quantity of the load 4, on the basis of executed operating data.

A setting block 64 causes operating data input from a host computer (not shown) via a data transmitter 65 to be sequentially stored in the set data memory 58, when on-line mode is selected by key switch 51, and causes operating data set through inputs 59, 66 by control signals from switches 44 to 47 or signals from the code reader 19 to be stored in the set data memory 58.

A screen display block (display control means) 67, commanded by operation mode signal and screen setting signal input from the control panel 41 through the input 59, edits data on the operation mode screen, data of function calling menu, and inventory management data stored in the data management block 63 in accordance with a predetermined format which has been prestored, and outputs the edited data to the liquid crystal display 42 for display thereon.

Through the above described arrangement, the ground-side control unit 8 controls the crane 7 through the optical transmission device 61 in response to operating data from the host computer, control signals from switches 44-50, and/or input signals from the code reader 19 for purposes of load entry and delivery operations, and causes the indicator lamps 42, 52, 55 to light for indication accordingly. When the .emergency stop switch 53 is operated during load entry/delivery operation, or when some trouble or failure should occur with respect to the crane 6, the ground-side control unit 8 stops all operations; and in the case of trouble or failure occurrence, the control unit 8 causes the liquid crystal display 42 to display the content of the trouble, abnormality confirmation, and necessary recovery procedure continually until the trouble has been corrected.

Figure 15:
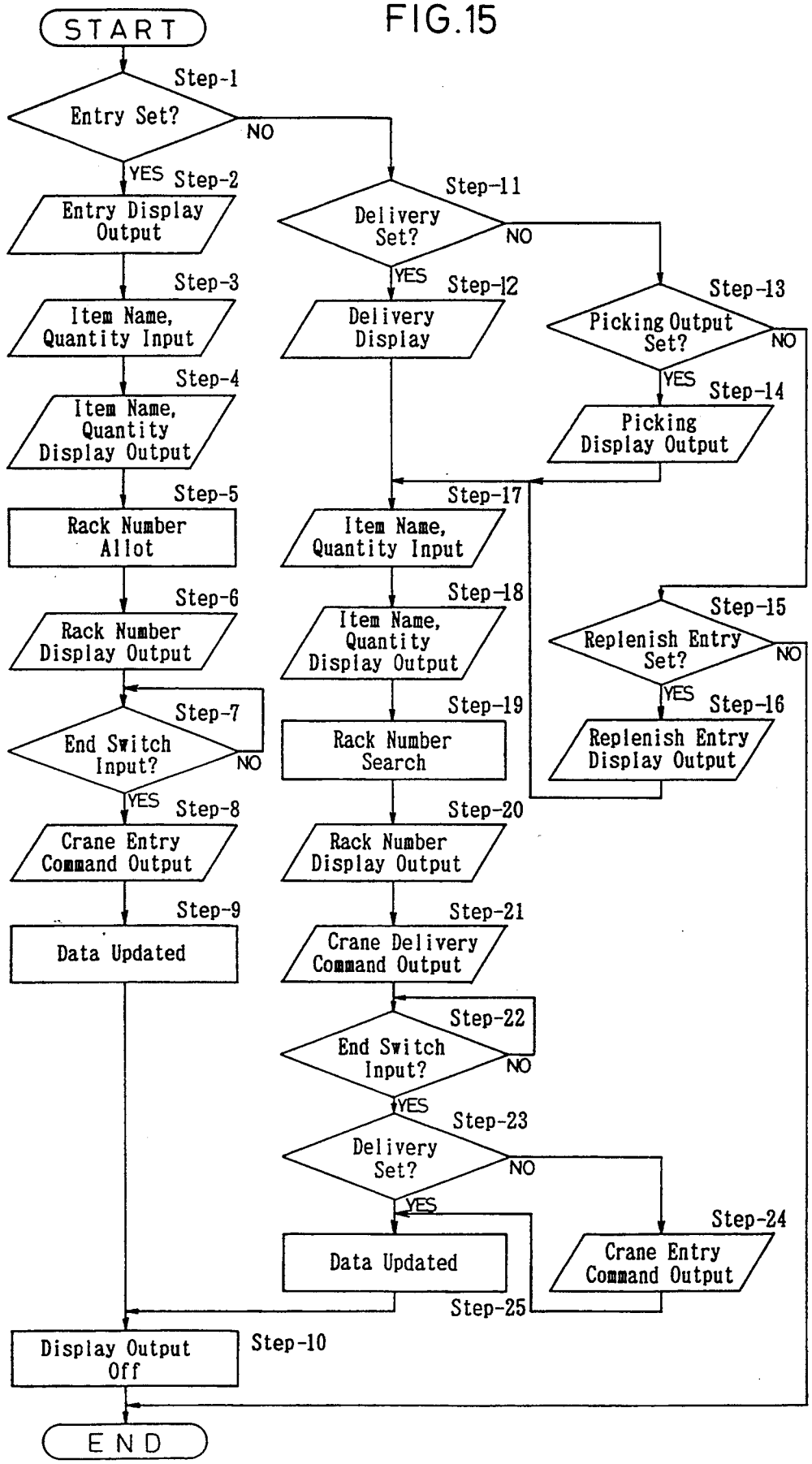
FIG. 15 is a flow chart illustrating the manner of operation of the control arrangement in the automatic warehousing system.

Operation of the control unit 8 in the case of the remote mode being selected by key switch 51 will now be explained with reference to the flow chart of FIG. 15.

First, it is verified that an operation mode signal for load entry setting has been input (step-1). After load entry setting is verified, load entry setting mode is displayed on liquid crystal display 42 (step-2). When bar code signals for item column 38 corresponding to the item name of load 4 and for digits corresponding to the quantity of the load 4 are input, the signals are stored as operating data (step-3), and both code number of the bar code in the item column 38 and the quantity are displayed on the liquid crystal display 42 (step-4). Then, on the basis of the input operating data, an unoccupied load storing space 1 is searched from item name-rack number data, and the rack number for the unoccupied load storing space 1 is allotted to the item, which is stored as item name-rack number data (step-5), the allotted rack number being displayed on the liquid crystal display 42 (step-6). Subsequently, upon input of an operating signal from ending switch 56 being verified (step-7), a load entry command consisting of a load entry instruction and a rack number designated for storing the load 4 is output to the crane 6 through optical transmission device 61 (step-8), inventory management data being then updated (step-9). Thereafter, output to the liquid crystal display 42 is turned off to erase display (step-10).

If load entry setting is not verified at step-1, it is determined whether or not operation mode signal for load delivery setting has been input (step-11). Upon load delivery setting being verified, delivery setting mode is displayed on the liquid crystal display (step-12). If load delivery setting is not verified, it is determined whether or not operation mode signal for picking setting has been input (step-13). When picking setting is verified, picking setting mode is displayed on the liquid crystal display 42 (step-14). If picking setting is not verified, it is determined whether or not operation mode signal for replenish entry setting has been input (step-15). When replenish entry setting is verified, replenish entry setting mode is displayed on the liquid crystal display 42 (step-16). In the case of delivery setting or picking setting or replenish entry setting, if bar code signal for an item column 38 corresponding to load 4 and bar code signal for digits corresponding to the quantity are input in turn, the signals are stored as operating data (step-17). In the case of delivery setting, bar code signal for digits corresponding to the quantity need not be input. In this case, code number for bar code in the item column 38 and the quantity involved are displayed on the liquid crystal display 42 (step-18). Then, on the basis of the operating data, the rack number of the space in which the outgoing load 4 is stored is retrieved from item number-rack number data (step-19), and the retrieved rack number is diplayed on the liquid crystal display 42 (step-20). Subsequently, a delivery command consisting of a delivery instruction and the rack number of the space in which the load 4 is stored is output to the crane 6 through the optical transmission device 61 (step-21). Upon input of an operating signal from the ending switch 56 being verified (step-22), it is verified whether or not the signal is for delivery setting (step-23). Where the signal not for delivery setting, an entry command consisting of an entry instruction and the rack number of the space in which the load 4 has been stored is output to the crane 6 through the optical transmission device 22 (step-24), and then the item name-rack number data and inventry management data are updated (step-25). Thereafter, step-10 is executed.

Figure 16:
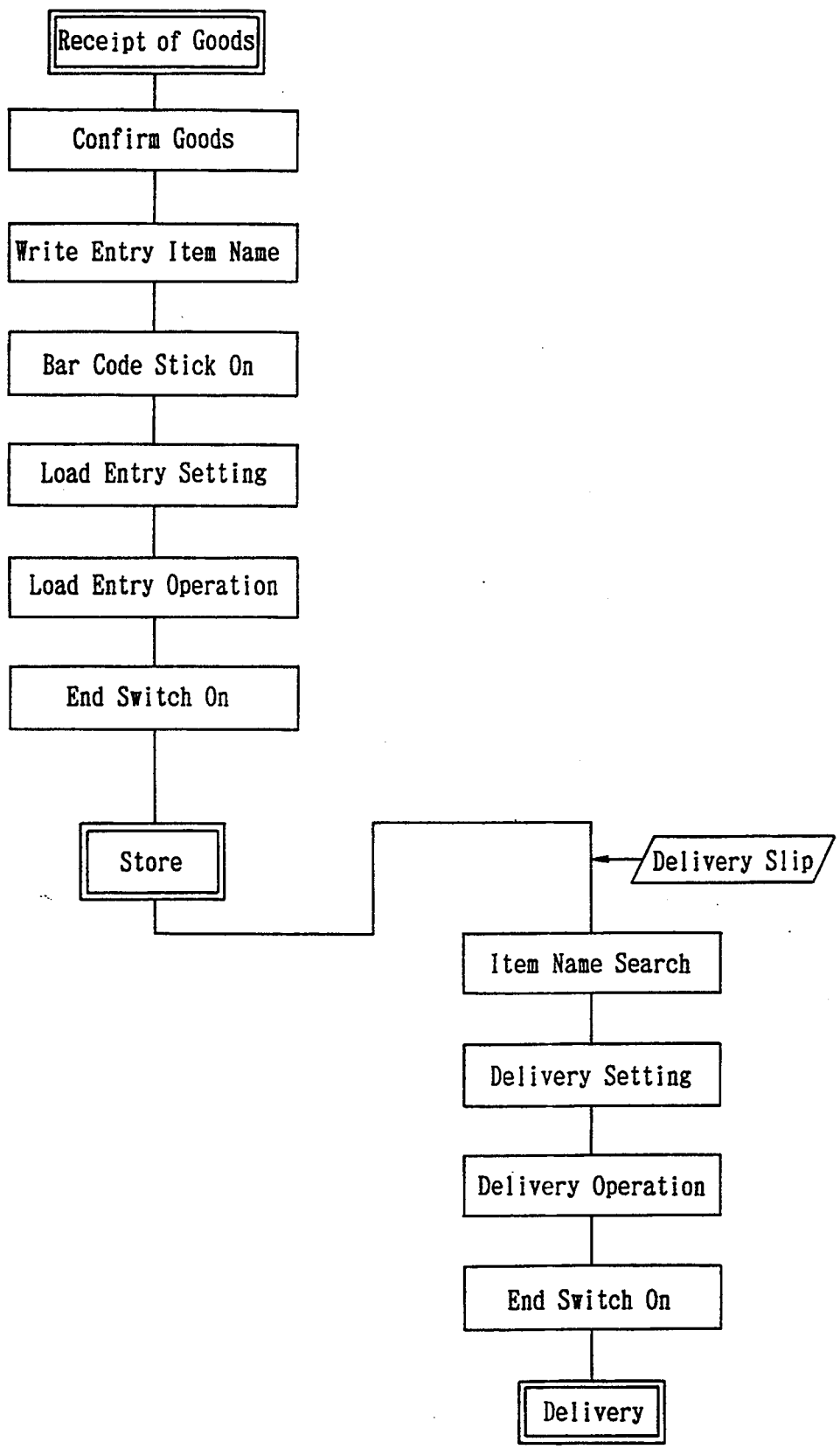
FIG. 16 is a flow chart illustrating the operational procedure for the automatic warehousing system.

Operating procedure with the foregoing arrangement, and operation of the control unit 8, in the case of load entry operation and of load delivery operation will be explained with reference to the flow chart of FIG. 16.

In load entry operation, the operator first confirms the load 4 received, and at sight of the actual goods he writes item name of the goods to be stored in load storing space 1, in item column 38 of item sheet 27 of operating file 26, then sticks on bar code label 33A in position. As can be seen from FIG. 14, when the operating file 26 is opened at item sheet 27, bar codes for setting operation mode and particulars of operation with respect to the automatic warehousing system are always present on the opposite page. Therefore, by using code reader 19 the operator can readily read operation bar codes and numerical bar codes, and also bar codes in item column 38, then input the readings to control unit 8. That is, entry operation mode is set by operation bar codes 39, entry quantity by numerical bar codes 40, item name of the load 4 to be stored by bar code in item column 38. Operating data for the operation mode are set by inputting "set" of bar codes 39 by means of bar code reader 19. Input operation data setting can be cleared by inputting "clear".

The control unit 8, in response to signals from operation bar codes 39 indicating entry operation mode, causes liquid crystal display 42 to display entry operation mode, and in response to signals from numerical bar codes 40 indicating quantity of goods to be stored, causes the quantity to be displayed, and in response to signals from bar codes in item column 38, causes the liquid crystal display 42 to display bar code number of the item name of the load 4 to be stored.

The operator performs entry operation such that load 4 is placed on delivery table 5 by using handling vehicle 3, and manipulates ending switch 56. Thereupon, the control unit 8 allots a rack number according to bar code signals from item column 38, updates item name-rack number data, outputs entry command signal to the crane 6 through optical transmission device 22, causes the load 4 to be transferred from delivery table 5 to the allotted load storing space 1 for storage therein, and updates inventory management data.

When a delivery slip is received, the operator, at sight of the name written in the slip, searches item column 38 of item sheet 27 in operating file 26, causes bar code reader 19 to read bar codes 39 for delivery operation in the opposite page, quantity bar codes 40, and bar codes in the retrieved item column 38, and inputs "set" of bar codes 39, whereby operation data for the delivery operation mode are input to the control unit 8. The control unit 8 causes the liquid crystal display 42 to display delivery operation mode when delivery operation mode is determined through operation bar codes 39, to display quantity of the goods to be delivered, when the quanity is determined through signals from numerical bar codes 40, and to display code number of the bar code corresponding to the item name of the load 4 to be delivered. Then, the rack number with respect to the load 4 to be delivered is searched from item name-rack number data according to bar code signals of item column 38, and same is caused to be displayed, and a delivery command signal is output to the crane 6 through the optical transmission device 61.

When load 4 of the input item name is delivered onto the delivery table 5 through control of the crane 6 by the control unit 8, the operator carries out delivery operation by using handling vehicle 3 for shipment of the load 4. The operator then manipulates ending switch 56 to input operation end to the control unit 8. Control unit 21 updates the item name-rack number data and inventory management data.

In this way, the control unit 8 performs management of load storing spaces 1 in rack 2 and of loads 4 stored in the load storing spaces 1 in responce to code signals input from the code reader 19, that is, item name-rack number management, so that the operator can carry out setting input to the control unit 8 simply by inputting item name and without considering rack number of load storing space 1, and can easily perform inventory management through item name-quantity management. Furthermore, the arrangement of the invention involves less operational procedure than the prior art arrangement, and this provides for improvement in operating efficiency.

In case that operating file 26 cannot be used due to, for example, failure of code reader 19, or during the process of maintenece and checking of code reader 19, instruction inputting to the ground-side control unit 8 can be carried out through control of switches 44–51, and 53 of the manual control device 43, whereby the required load entry and delivery operations can be satisfactorily carried out.

Nextly, the manner of preparation of item sheet 27 in the case where different kinds of loads 4 are to be stored in one load-storing space will be explained.

Where different loads 4 are to be stored in mixture, as FIGS. 17a–d illustrates, item names of loads 4 to be stored are written in item columns 38 for the loads 4 and identical code labels 33A are sticked on in the item columns. In the FIGS. 17a–d example, "terminal" and "AC adapter" are to be stored in mixture, and identical 1-0012 bar code labels 33A are sticked on in the item columns.

By affixing identical bar code to the item columns for different loads 4 stored in same storing space in this way, one load storing space 1 is managed in relation to one bar code. Thus, by reading one code corresponding to different kinds of loads 4 stored in mixture, it is possible to carry out load entry and delivery operations with respect to loads 4 stored in mixture in one load storing space 1. This naturally leads to improved operating efficiency.

Figure 18A:
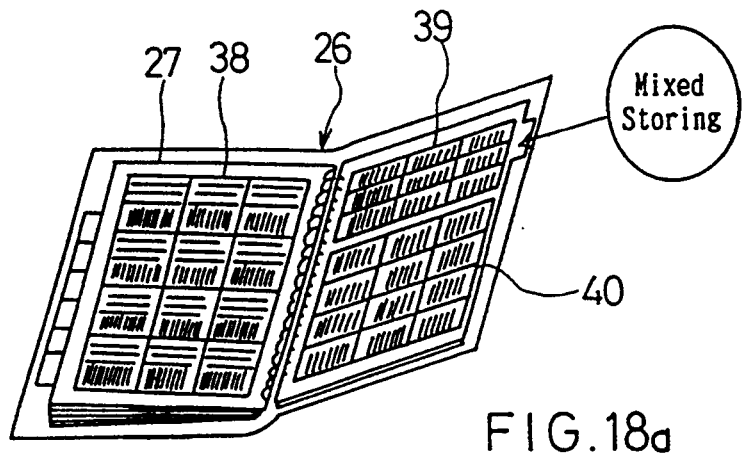
FIG. 18a is a perspective view showing another embodiment of the operating file for the automatic warehousing system according to the invention, wherein the operating file is shown opened.
Figure 18B:
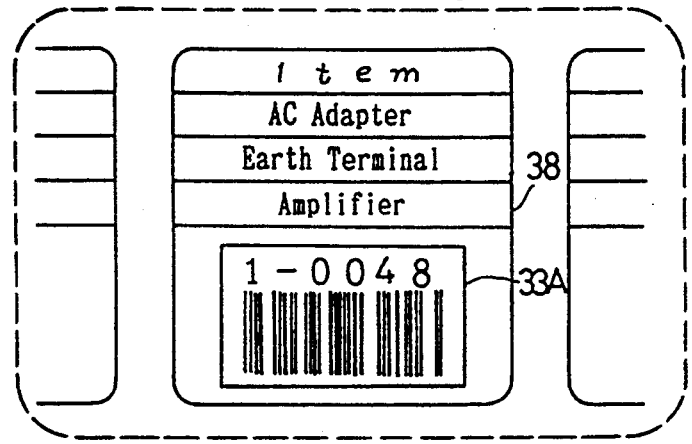

In FIGS. 18a–b, item sheet 27 has item columns 38 adapted for entry of all item names with respect to loads 4 to be stored in mixture, and one bar code corresponds in common to all loads 4 stored in mixture. In the example shown in FIGS. 18a–b, "AC adapter", "earth teminal" and "amplifier" are stored in mixture. An index indicating "mixture" is shown attached to the item sheet 33.

Provision in the item column 38 of a column for entry of item names or item numbers for different kinds of loads stored in one load storing space 1 in this way permits easy management of loads 4 stored in one load storing space 1 under one bar code; and by reading the bar code it is possible to carry out entry and deliver operations with respect to the loads 4 stored in mixture in one load storing space 1. Thus, the operator need not conduct item name-rack number management as has hitherto been required. This naturally contributes toward improvement in operating efficiency.

Where item names of all loads 4 to be stored in a plurality of automatic warehousing systems are filed in operating file 26, for the purpose of discriminating the warehousing systems one from another, each bar code label 33A is formed with a code for system number in conjunction with the code corresponding to item name, as shown by way of example on enlarged scale in FIG. 19. Therefore, the operator can discriminate automatic warehousing system in which loads 4 of same item name are stored, one from another. Further, as FIGS. 20a–c show, it is possible to file in one operating file the item names of all loads 4 stored in different automatic warehousing systems by, for example, arranging them in alphabetical order (item name of terminal is shown in FIGS. 20a–c), so that items names are made easy to read and easy to retrieve. This also cotributes toward improvement in operating efficiency.

Figure 21:
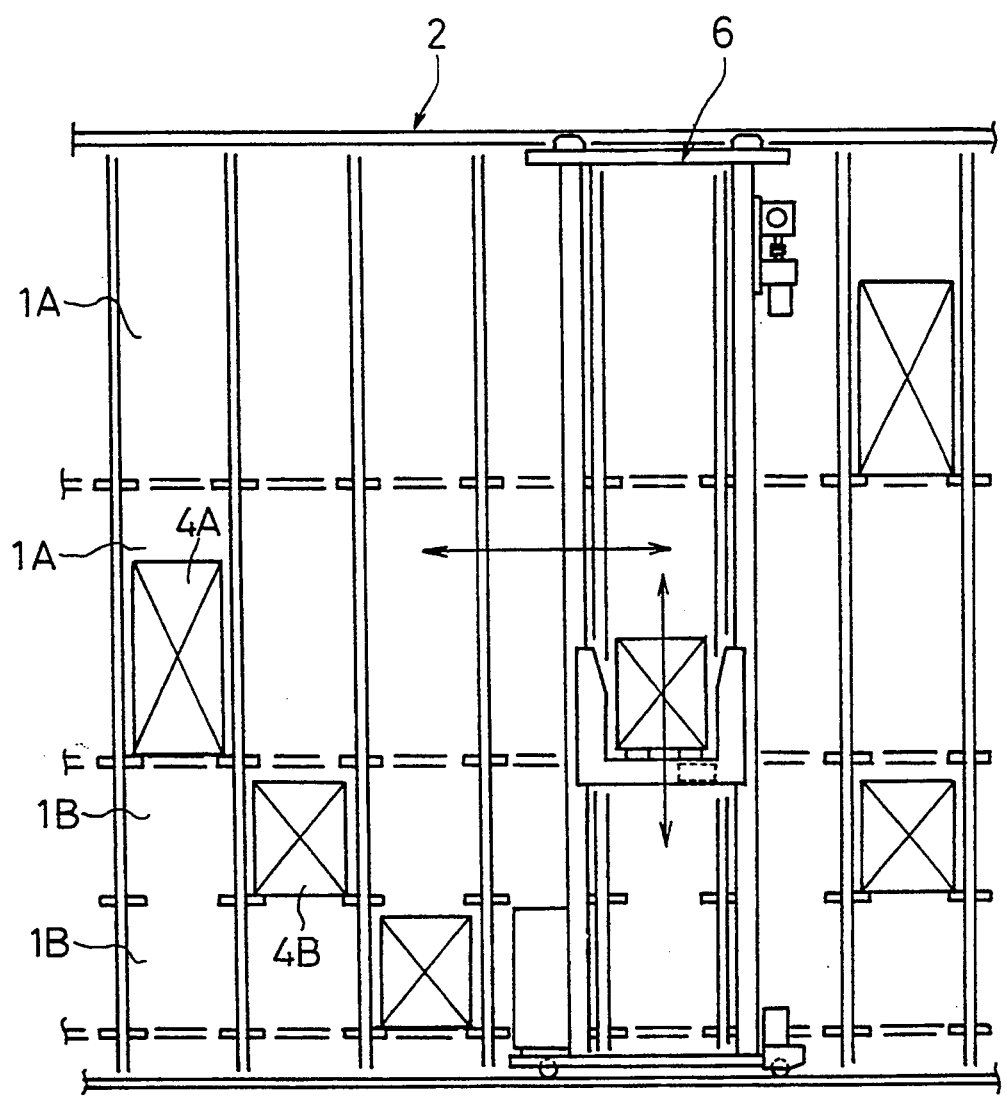
FIG. 21 is a side view showing a rack portion of an automatic warehousing system representing another embodiment of the invention.

In the case where, as shown in FIG. 21, the rack 2 has two tiers of load storing spaces 1A for loads 4A of higher load height and two tiers of load storing spaces 1B for loads 4B of lower load height, in order to facilitate storing of loads according to their height, it is arranged that, as shown in FIG. 22 on enlarged scale, code numbers of code labels 33A are classified into code numbers whose most significant digit is 5 or above and code numbers whose most significant digit is less than 5, the former code numbers being for use with loads of higher load height and the latter for use with loads of lower load height. Therefore, the operator can select a bar code label 33A according to the height of each load and stick on the label in position, as shown in FIGS. 23a-d in which a code number having a digit level of 5000 is selected for a terminal having higher height and a code number having a digit level of 0 is selected for an AC adapter having lower height). With application of bar code labels 33A according to load height, management of load storing spaces 1 of the rack 2 is carried out by the control unit 8 through bar codes in a manner matching the item names and load height of loads 4. Therefore, when carrying out entry and delivery operations with respect to loads having different heights, the operator is no longer required to make such troublesome control of item names and load storing spaces of the rack 2 as has hitherto been required, and can operate with improved efficiency.

In the foregoing embodiment, bar codes are used; but it is understood that other kinds of codes, such as color codes, digits, and characters, may be used instead of bar codes.

What is claimed is:

1. An automatic warehousing system characterized by racks (2) having a plurality of load storing spaces (1), a place (9) for the acceptance and delivery of the load (4), means (6) movable on a predetermined path (10) extending between said racks (2) and along a boundary line of said place (9) for taking the load (4) in and out of any one of said spaces (1), and safety fences (7) disposed in both end portions of said predetermined path (10), one of said safety fences (7) being equipped with a control unit (8) to which a code reading (19) is removably connected and with an openably closed door structure (15), said door structure (15) being equipped with a holding portion (24) for a file formed with codes corresponding to goods (4).

2. An automatic warehousing system characterized by racks (2) having a plurality of load storing spaces (1), a place (9) for the acceptance and delivery of the load (4), means (6) movable on a predetermined path (10) extending between said racks (2) and along a boundary line of said place (9) for taking the load (4) in and out of any one of said spaces (1), a control unit (8) for controlling said means (6), said control unit (8) being disposed in one end portion of said predetermined path (10), a code reader (19) connected to said control unit (8), and a door structure (15) hinged on the control unit side for being pivoted for opening and closing movement, said door structure (15) being equipped with a holding portion (24) for a file for use with said code reader (19) and a table (17), said table (17) being formed with a setting portion (18) at a location adjacent said control unit (8).

3. An automatic warehousing system characterized by racks (2) having a plurality of load storing spaces (1), a place (9) for the acceptance and delivery of the load (4), means (6) movable on a predetermined path (10) extending between said racks (2) and along a boundary line of said place (9) for taking the load (4) in and out of any one of said spaces (1), a control unit (8) disposed in one end portion of said predetermined path (10), a code reader (19) detachably connected to said control unit (8), and a holding device (21) for a file for use with said code reader (19), said holding device (21) comprising a table (17), a vertically extending insertion hole (23) formed in the table (17), and a housing portion (24) having a top end opening (24A) which is in communication with said insertion hole (23), wherein the file is housed at a level lower than the surface of the table (17).

4. An automatic warehousing system characterized by racks having a plurality of load storing spaces, load handling means for handling goods for entry into and delivery from the load storing spaces within said racks, input means for inputting codes corresponding to the goods, and control means which performs management of each of said load storing spaces in said racks and goods stored in each load storing space according to a code signal corresponding to the goods, input from said input means, and which controls load entry and delivery operations of said load handling means, said input means having an operation file comprising a plurality of sheets bound in the form of a file, each of said sheets being adapted for a code label to be stuck thereon and corresponding to said goods and having a space for the entry of item names or items numbers of said goods, and said input means having means for reading the code of said code label.

5. An automatic warehousing system as set forth in claim 4, wherein said input means further inputs operation modes and said control means performs said management and control on the basis of an operation mode signal and a code signal corresponding to the goods input from said input means.

6. An automatic warehousing system as set forth in claim 5, wherein said input means further inputs digital codes and said control means performs said management and control on the basis of said operation mode signal, a digitalized quantity signal and said code signal corresponding to the goods input from said input means.

* * * * *